US011867900B2

(12) United States Patent
Sharma et al.

(10) Patent No.: US 11,867,900 B2
(45) Date of Patent: Jan. 9, 2024

(54) BRIGHT PUPIL EYE-TRACKING SYSTEM (71) Applicant: Meta Platforms Technologies, LLC, Menlo Park, CA (US)

(72) Inventors: Robin Sharma, Redmond, WA (US); Mohamed Tarek El-Haddad, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 129 days.

(21) Appl. No.: 16/844,890

(22) Filed: Apr. 9, 2020

(65) Prior Publication Data
US 2021/0271317 A1 Sep. 2, 2021

Related U.S. Application Data (60) Provisional application No. 62/983,352, filed on Feb. 28, 2020.

(51) Int. Cl.
*G02B 27/00* (2006.01)
*G06F 3/01* (2006.01)
(Continued)

(52) U.S. Cl.
CPC ..... *G02B 27/0093* (2013.01); *G02B 27/0172* (2013.01); *G06F 3/013* (2013.01);
(Continued)

(58) Field of Classification Search
CPC .............. G02B 27/0093; G02B 27/017; G02B 27/0172; G06F 3/011; G06F 3/013; G06T 2207/30041; G06T 7/0016; G06V 40/18; G06V 40/19; H05B 47/13; H05B 47/155; H05B 47/165; Y02B 20/40
See application file for complete search history.

(56) References Cited

U.S. PATENT DOCUMENTS 5,815,741 A   9/1998  Okuyama et al.
6,027,216 A * 2/2000  Guyton ................. A61B 3/113
                                                    351/200
(Continued)

FOREIGN PATENT DOCUMENTS

EP   3079560 A1   10/2016
WO  2016162822 A1 10/2016

OTHER PUBLICATIONS

International Searching Authority, Patent Cooperation Treaty, European Application No. PCT/US2021/019912, dated Jun. 18, 2021, 9 pages.

(Continued)

*Primary Examiner* — Ram A Mistry
(74) *Attorney, Agent, or Firm* — FREESTONE INTELLECTUAL PROPERTY LAW PLLC; Aaron J. Visbeek (57) ABSTRACT

An eye-tracking method includes enabling at least one light source of an array of light sources to emit non-visible light to illuminate an eye. The method also includes obtaining at least one image of the eye while the at least one light source is enabled. A position of the eye may then be determined based on a position of the at least one light source within the array of light sources in response to determining that the at least one image indicates a bright pupil condition when the at least one light source was enabled.

20 Claims, 10 Drawing Sheets (51) Int. Cl.
  *G06T 7/00* (2017.01)
  *G02B 27/01* (2006.01)
  *H05B 47/13* (2020.01)
  *G06V 40/18* (2022.01)
  *G06V 40/19* (2022.01)

(52) U.S. Cl.
  CPC ............ *G06T 7/0016* (2013.01); *G06V 40/18* (2022.01); *G06V 40/19* (2022.01); *H05B 47/13* (2020.01); *G06T 2207/30041* (2013.01)

(56) References Cited

U.S. PATENT DOCUMENTS

| | | | |
|---|---|---|---|
| 8,596,786 B2 | 12/2013 | Bublitz et al. | |
| 10,268,268 B1 | 4/2019 | Trail | |
| 10,274,730 B2 | 4/2019 | Jepsen et al. | |
| 2008/0100803 A1 | 5/2008 | Dick et al. | |
| 2013/0286053 A1* | 10/2013 | Fleck | G02B 27/0176 345/82 |
| 2017/0038836 A1* | 2/2017 | Jepsen | G09G 3/36 |
| 2018/0070819 A1 | 3/2018 | Kanamori et al. | |
| 2018/0129167 A1 | 5/2018 | Maimone et al. | |
| 2019/0019023 A1 | 1/2019 | Konttori et al. | |
| 2019/0046031 A1 | 2/2019 | Kramer et al. | |
| 2019/0101767 A1 | 4/2019 | Geng et al. | |
| 2019/0250707 A1* | 8/2019 | Kondo | G02B 27/0179 |
| 2019/0282089 A1 | 9/2019 | Wang | |
| 2019/0361250 A1 | 11/2019 | Lanman et al. | |
| 2021/0165207 A1 | 6/2021 | Peyman | |

OTHER PUBLICATIONS

International Searching Authority, Patent Cooperation Treaty, European Application No. PCT/US2021/014970, dated Apr. 15, 2021, 3 pages.

International Searching Authority, Patent Cooperation Treaty, Written Opinion of the International Searching Authority, European Application No. PCT/US2021/014970, dated Apr. 15, 2021, 5 pages.

International Searching Authority, Patent Cooperation Treaty, Written Opinion of the International Searching Authority, European Application No. PCT/US2021/014693, dated Mar. 12, 2021, 12 pages.

International Searching Authority, Patent Cooperation Treaty, Written Opinion of the International Searching Authority, European Application No. PCT/US2020/063513, dated Feb. 18, 2021, 9 pages.

Non-Final Office Action dated Apr. 14, 2022 for U.S. Appl. No. 16/844,877, filed Apr. 9, 2020, 13 pages.

International Preliminary Report on Patentability for International Application No. PCT/US2020/063513, dated Aug. 18, 2022, 8 pages.

International Preliminary Report on Patentability for International Application No. PCT/US2021/014970, dated Sep. 9, 2022, 7 pages.

* cited by examiner

BRIGHT PUPIL EYE-TRACKING SYSTEM

CROSS-REFERENCE TO RELATED APPLICATION

The present application claims the benefit of U.S. Provisional Application No. 62/983,352, entitled "Bright Pupil Eye-Tracking System" filed Feb. 28, 2020. U.S. Provisional Application No. 62/983,352 is expressly incorporated herein by reference in their entirety.

FIELD OF DISCLOSURE

Aspects of the present disclosure relate generally to eye-tracking systems.

BACKGROUND

Eye tracking may refer to the process of detecting the direction of a user's gaze, which may include detecting the angular orientation of the eye in 3-dimensional (3D) space. Eye tracking may further include detecting the position and movements of the eye (e.g., the center of the eye), the torsion (i.e., the roll of the eye about the pupillary axis) of the eye, the shape of the eye, the current focal distance of the eye, the dilation of the pupil, other features of the eye's state, or some combination thereof.

Eye tracking systems may be utilized in a variety of contexts, such as medical research or diagnosis, human-computer interaction, etc. In some contexts, such as with head mounted displays (HMDs), it may be advantageous for the HMD to determine the location of the eye of the user and/or determine where the eyes of the user are focusing to alter the content being presented to the user.

BRIEF DESCRIPTION OF THE DRAWINGS

Non-limiting and non-exhaustive aspects of the present disclosure are described with reference to the following figures, wherein like reference numerals refer to like parts throughout the various views unless otherwise specified.

DETAILED DESCRIPTION

Various aspects and embodiments are disclosed in the following description and related drawings to show specific examples relating to an eye-tracking method and system. Alternate aspects and embodiments will be apparent to those skilled in the pertinent art upon reading this disclosure and may be constructed and practiced without departing from the scope or spirit of the disclosure. Additionally, well-known elements will not be described in detail or may be omitted so as to not obscure the relevant details of the aspects and embodiments disclosed herein.

In some implementations of the disclosure, the term "near-eye" may be defined as including an element that is configured to be placed within 50 mm of an eye of a user while a near-eye device is being utilized. Therefore, a "near-eye optical element" or a "near-eye system" would include one or more elements configured to be placed within 50 mm of the eye of the user.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.4 µm.

Figure 1A:
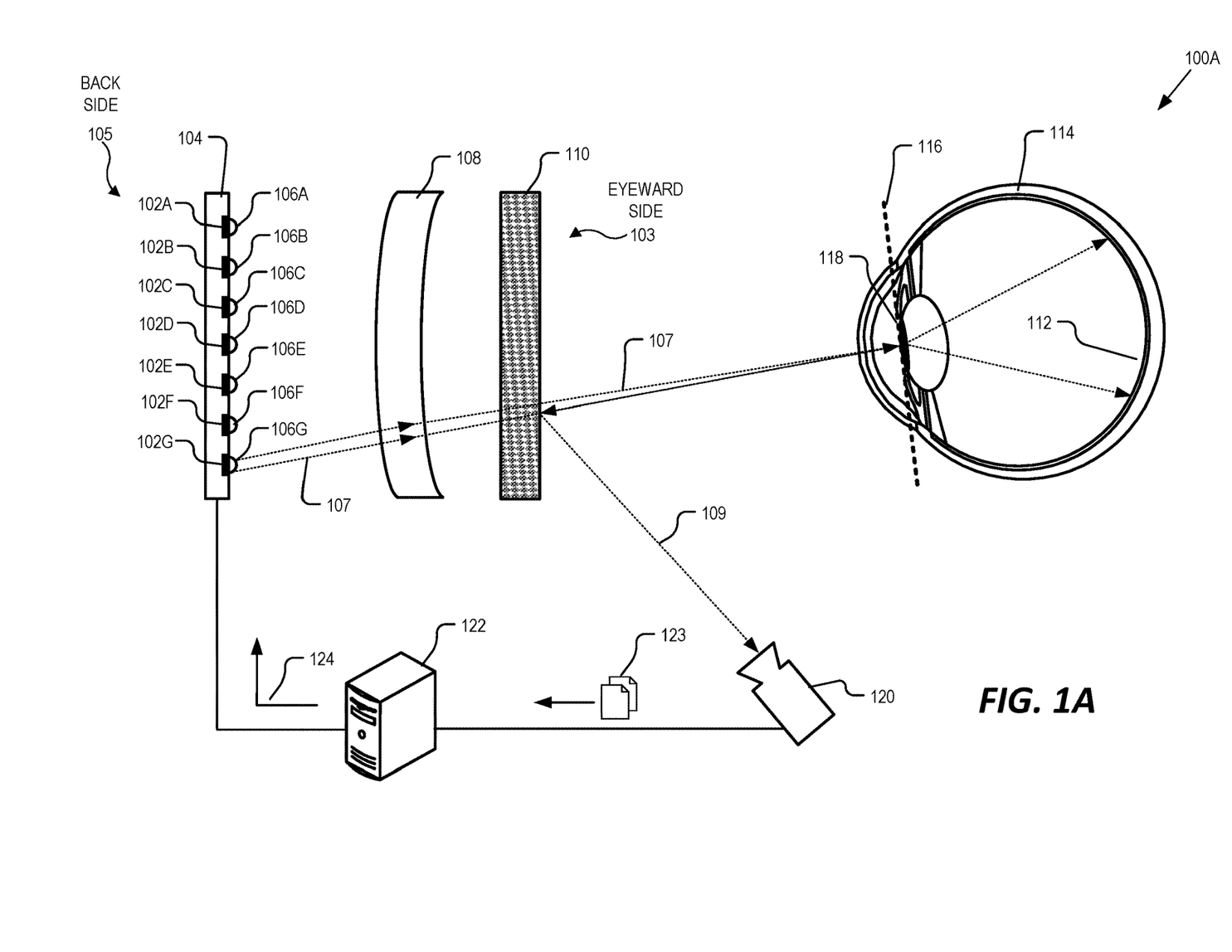
FIG. 1A illustrates an example eye-tracking system, in accordance with aspects of the present disclosure.

FIG. 1A illustrates an example eye-tracking system 100A, in accordance with aspects of the present disclosure. The illustrated example of eye-tracking system 100A includes an array of light sources 102A-102G, a layer 104, beam shaping optics 106A-106G, an optical element 108, an optical combiner 110, a camera 120, and a computing device 122. Also shown in FIG. 1A is an eye 114 that includes a fundus 112, a pupil 118, and a pupil plane 116.

As shown in FIG. 1A, the light sources 102A-102G are disposed on layer 104. Layer 104 may be a transparent substrate, such as glass or plastic. In one example, the light sources 102A-102G may be encapsulated within the transparent substrate. The transparent substrate may be transmissive to visible light (e.g. 400 nm-750 nm) and may be configured to be placed on a display plane of an electronic or optical display layer (e.g., a liquid crystal display (LCD), an organic light emitting diode (OLED) display, a micro-LED display, a waveguide, etc.) that is configured to generate display light for presentation to the user. In another example, layer 104 is, itself, the electronic or optical display layer, where light sources 102A-102G are disposed on the display layer, interspersed within display light that is generated by the display layer (e.g., within the field of view of the user).

Each light source 102A-102G may be a micro light emitting diode (micro-LED), an edge emitting LED, a vertical cavity surface emitting laser (VCSEL) diode, or a Superluminescent diode (SLED). In addition, each light source 102A-102G may be individually enabled to emit non-visible light 107 to illuminate the eye 114. In some examples, non-visible light 107 is infrared light or near-infrared light. In some aspects, each light source 102A-102G is arranged on layer 104 in a two-dimensional (2D) array of columns and rows. In some examples, each light source 102A-102G may be referred to as a point light source, where only one of the light sources 102A-102G are enabled at a time to emit non-visible light 107 (e.g., in the illustrated example of FIG. 1A, only a single light source 102G is currently enabled to emit non-visible light 107).

The illustrated example of FIG. 1A also illustrates a plurality of beam shaping optics 106A-106G. Each beam shaping optic 106A-106G may be disposed on a corresponding light source 102A-102G to direct the non-visible light emitted by each light source along a respective optical axis. Thus, in some aspects, each light source 102A-102G may be configured, by way of a respective beam shaping optic 106A-106G, to emit non-visible light 107 along a different optical axis. For example, beam shaping optic 106A may be configured to direct non-visible light generated by light source 102A along a first optical axis, whereas beam shaping optic 106B may be configured to direct non-visible light generated by light source 102B along a second (i.e., different) optical axis. In some examples, each of the beam shaping optics 106A-106G may also be configured to collimate the non-visible light 107 generated by a respective light source 102A-102G.

As shown in FIG. 1A, the eye-tracking system 100A also includes an optical element 108 that is disposed between the beam shaping optics 106A-106G and an eyeward side 103 of the eye-tracking system 100A. FIG. 1A also illustrates an optical combiner 110 that is disposed between the light sources 102A-102G and the eyeward side 103, and in particular may be disposed between the optical element 108 and the eyeward side 103. In some examples, optical element 108 includes one or more lenses that are configured to receive the collimated non-visible light 107 and to focus the collimated non-visible light 107 through the optical combiner 110 to the pupil plane 116 of the eye 114. Thus, in some examples, the optical element 108 provides a "Maxwellian view" of the non-visible light 107. As shown in FIG. 1A, the non-visible light 107 then expands as it exits the pupil 118 towards to back of the eye 114 to illuminate a large area of the fundus 112.

In some aspects, the optical combiner 110 is configured to receive reflected non-visible light 109 (having the wavelength emitted by the light sources 102A-102G) that is reflected/scattered by the fundus 112 of eye 114 and to direct the reflected non-visible light 109 to the camera 120. The camera 120 may be located in different positions than the positions illustrated. In some aspects, the optical combiner 110 is transmissive to visible light (e.g. approximately 400 nm-700 nm), such as scene light (e.g., from the environment) that is incident on the backside 105 of the eye-tracking system 100A. Even still, in some examples, the optical combiner 110 is transmissive to visible light that is generated by a display layer (e.g., layer 104). In some examples, the optical combiner 110 may be configured as a holographic optical element (HOE) or a volume hologram that may include one or more Bragg gratings for directing the reflected non-visible light 109 toward the camera 120. In some examples, the optical combiner 110 includes a polarization-selective volume hologram (a.k.a. polarized volume hologram) that diffracts (in reflection) a particular polarization orientation of incident light having a particular wavelength toward camera 120 while passing other polarization orientations.

The camera 120 is configured to generate one or more images 123 of the eye 114, where the images 123 are of the reflected non-visible light 109. In some examples, camera 120 may be configured to filter out light that is other than the non-visible light 107/reflected non-visible light 109 such that the camera 120 only images the wavelength of the reflected non-visible light 109.

In some examples, the computing device 122 may be configured to determine eye-tracking information (e.g., location, orientation, gaze angle, etc.) of the eye 114 based on images 123 captured by the camera 120. As will be described in more detail below, the computing device 122 may then process the images 123 to detect a bright pupil condition to determine eye-tracking information (e.g., position, orientation, gaze angle, etc. of the eye 114). For example, the computing device 122 may determine whether the eye 114 is looking in the straight, left, right, upwards, or downwards direction.

In some embodiments, the computing device 122 may include a light source control module that is communicatively coupled to the array of light sources 102A-102G. As discussed above, each of the light sources 102A-102G may emit non-visible light 107 along a respective optical axis. If the eye 114 is misaligned with a currently-enabled light source 102A-102G, then the pupil 118 of the eye may vignette the non-visible light 107 which may reduce or prevent the light from reaching the fundus 112, which will darken the appearance of the pupil 118 in the resultant image 123. However, if the eye 114 is aligned with the currently-enabled light source 102A-102G (e.g., along the same optical axis as the non-visible light 107 being emitted), then the pupil 118 will appear brighter in the resultant image 123.

Accordingly, the control module of computing device 122 may generate one or more control signals 124 to selectively enable at least one of the light sources 102A-102G and analyze the resultant images 123 to detect a bright pupil condition. If an image 123 that was captured while a particular light source (e.g., light source 102G) was enabled indicates a bright pupil condition, then the computing device 122 may then determine a position/gaze angle of the eye 114 based on a position of that light source (e.g., light source 102G) within the array of light sources.

Figure 1B:
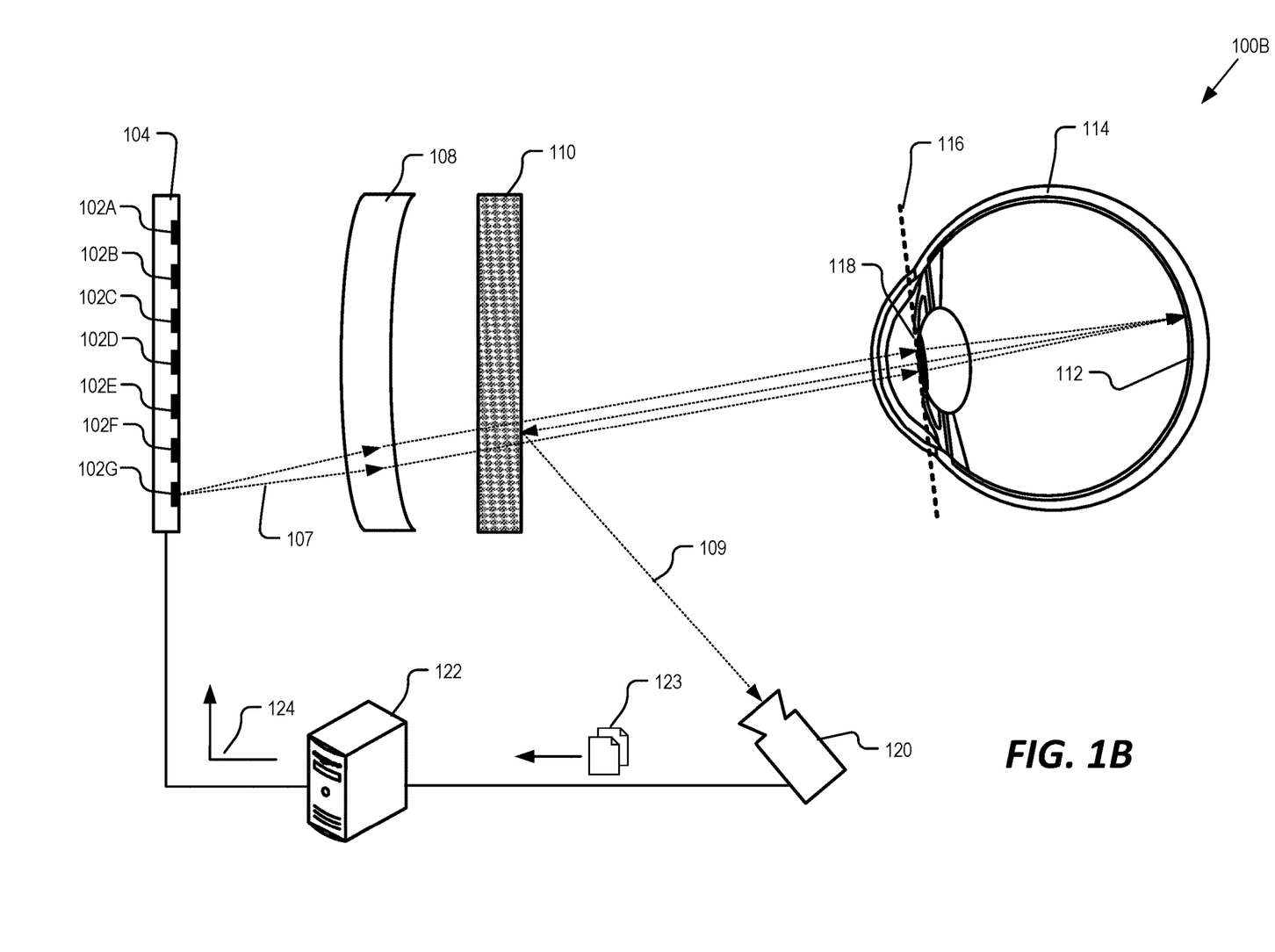
FIG. 1B illustrates another example eye-tracking system, in accordance with aspects of the present disclosure.

As mentioned above, the beam shaping optics 106A-106G may be configured to collimate the non-visible light 107 that is emitted by the light sources 102A-102G, where optical element 108 then focuses the collimated non-visible light onto the pupil plane 116. However, in other examples of the present disclosure, the beam shaping optics 106A-106G that collimate the non-visible light may be omitted. For example, FIG. 1B illustrates another example eye-tracking system 100B, in accordance with aspects of the present disclosure. In the illustrated example of FIG. 1B, the non-visible (and non-collimated) light 107 emitted by the light source 102G is received by optical element 108. In this example, the optical element 108 may then collimate the non-visible light and direct the collimated non-visible light to the eye 114. The eye 114 then focuses the collimated non-visible light (e.g., by way of the lens of the eye 114) onto the fundus 112. In this example, the fundus 112 may act as a retroreflector where the reflected non-visible light is reflected back at an angle that is substantially the same as the angle that the non-visible light is incident upon the fundus 112. Similar to the example of FIG. 1A, the reflected non-visible light 109 is received by the optical combiner 110, which then directs the reflected non-visible light 109 to the camera 120 to generate the images 123.

Figure 2:
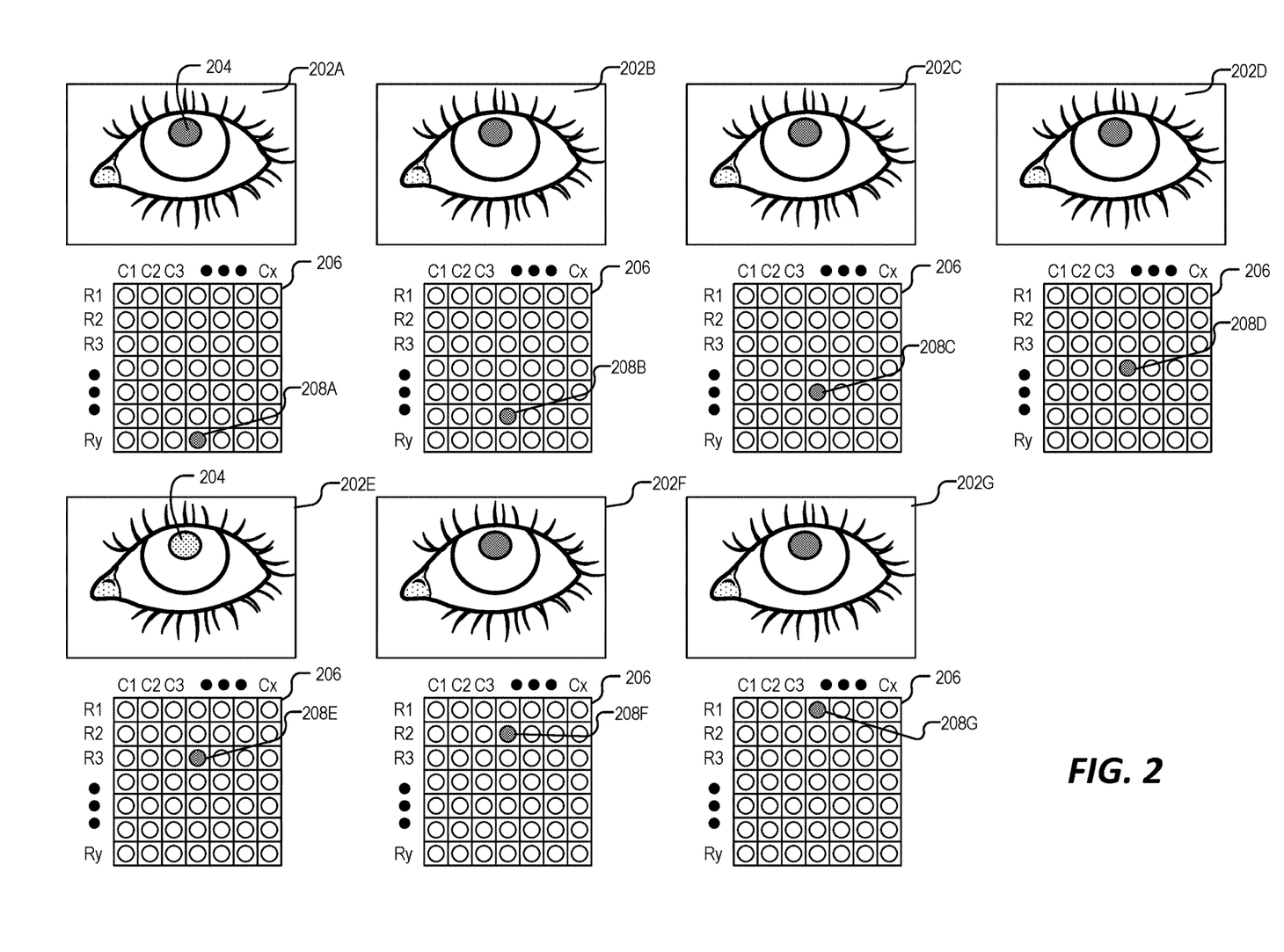
FIG. 2 illustrates an array of light sources and the corresponding images of an eye captured when at least one of the light sources are enabled, in accordance with aspects of the present disclosure.

FIG. 2 illustrates an array of light sources 206 and the corresponding images 202A-202G of an eye captured when at least one of the light sources are enabled, in accordance with aspects of the present disclosure. The array of light sources 206 is one possible example of the array of light sources 102A-102G of FIGS. 1A and 1B. Similarly, the images 202A-202G are possible examples of the images 123. As discussed above, each of the light sources of the array of light sources 206 may be individually enabled to emit non-visible light to illuminate the eye, where a corresponding image may then be captured of the eye while the light source is enabled. By way of example, FIG. 2 illustrates an image 202A that was captured when light source 208A was enabled, image 202B is an image of the eye when light source 208B was enabled, image 202C is an image of the eye when light source 208C was enabled, image 202D is an image of the eye when light source 208D was enabled, image 202E is an image of the eye when light source 208E was enabled, image 202F is an image of the eye when light source 208F was enabled, image 202G is an image of the eye when light source 208G was enabled, and so on. The images captured by the camera (e.g., camera 120 of FIG. 1A) may then be analyzed by a computing device (e.g., computing device 122 of FIG. 1A). In one example, analyzing the images 202A-202G includes determining if any of the images indicate a bright pupil condition. In the illustrated example of FIG. 2, image 202E indicates a bright pupil condition of the pupil 204. In response to determining that an image indicates a bright pupil condition, the computing device determines that the eye was aligned with the light source that was enabled when the image was obtained (e.g., the eye was aligned with light source 208E when image 202E was captured). The computing device may then determine the position of the eye based on a known position of the light source 208E within the array 206. In some examples, determining the position of the eye includes translating the position of the light source 208E to a calculated eye position and/or gaze angle.

In some examples, determining whether a bright pupil condition exists includes comparing a brightness of the pupil 204 in one image to the brightness of the pupil 204 in another image. In some aspects, this may include utilizing one or more computer-vision techniques to identify a pupil region of each image and determining a brightness of the pupil region (e.g., average brightness of all pixels within the pupil region). The determined brightness of the pupil region may then be compared with the brightness determined in other images, where the image with the brightest pupil region is determined to indicate a bright pupil condition.

In other examples, the bright pupil condition may be determined by comparing the brightness of the pupil region of an image with a brightness threshold. That is, in this example, rather than comparing images together, the brightness of the pupil region of one image may be compared against a fixed or dynamically-created threshold that indicates the bright pupil condition.

Figure 3A:
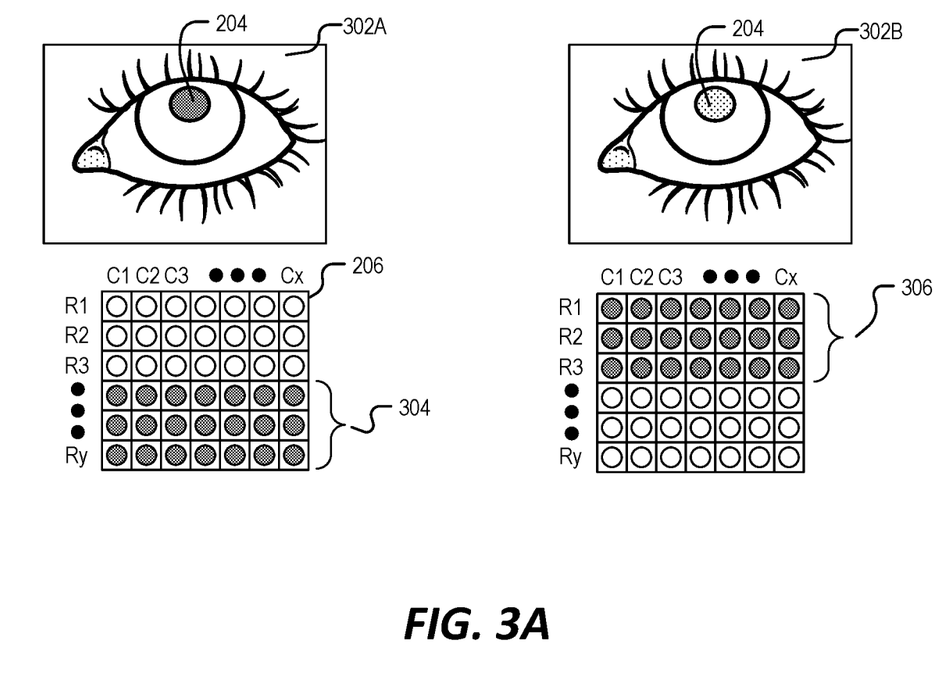
FIG. 3A illustrates an array of light sources and the corresponding images of an eye captured when a grouping of light sources are enabled, in accordance with aspects of the present disclosure.

In some aspects, each light source of the array of light sources 206 may be individually enabled and a corresponding image captured. However, in other examples, two or more groupings of light sources may be enabled, where corresponding images are obtained to determine whether the eye is aligned with a particular grouping of light sources. By way of example, FIG. 3A illustrates the array of light sources 206 and the corresponding images 302A and 302B of an eye captured when a grouping of light sources are enabled, in accordance with aspects of the present disclosure. As shown in FIG. 3A, image 302A is an image of the eye captured when a first grouping 304 of light sources were enabled, whereas image 302B is an image of the eye captured when a second grouping 306 of light sources were enabled. Although FIG. 3A illustrates only two groupings of light sources, other embodiments may include multiple groupings of the array of light sources 206, including two or more.

In some examples, enabling a grouping of light sources includes simultaneously enabling multiple light sources of the array of light sources 206, where the captured image includes an image of the eye when all of the light sources in the grouping were enabled. The resultant images 302A and 302B may then be analyzed (e.g., by computing device 122) to determine whether a bright pupil condition exists, either by comparing the brightness of the pupil 204 of image 302A with the brightness of the pupil 204 of image 302B, or by comparing the brightness of the pupil 204 in each image with the brightness threshold. In the illustrated example, image 302B indicates the bright pupil condition.

An image that indicates a bright pupil condition when a grouping of light sources were enabled means that one of the light sources included in the grouping of light sources 206 is aligned with the eye. Thus, in some examples, each light source of that grouping (e.g., grouping 306 of FIG. 3A) may then be individually enabled (and a corresponding image captured) to determine the particular light source that caused the bright pupil condition.

Figure 3B:
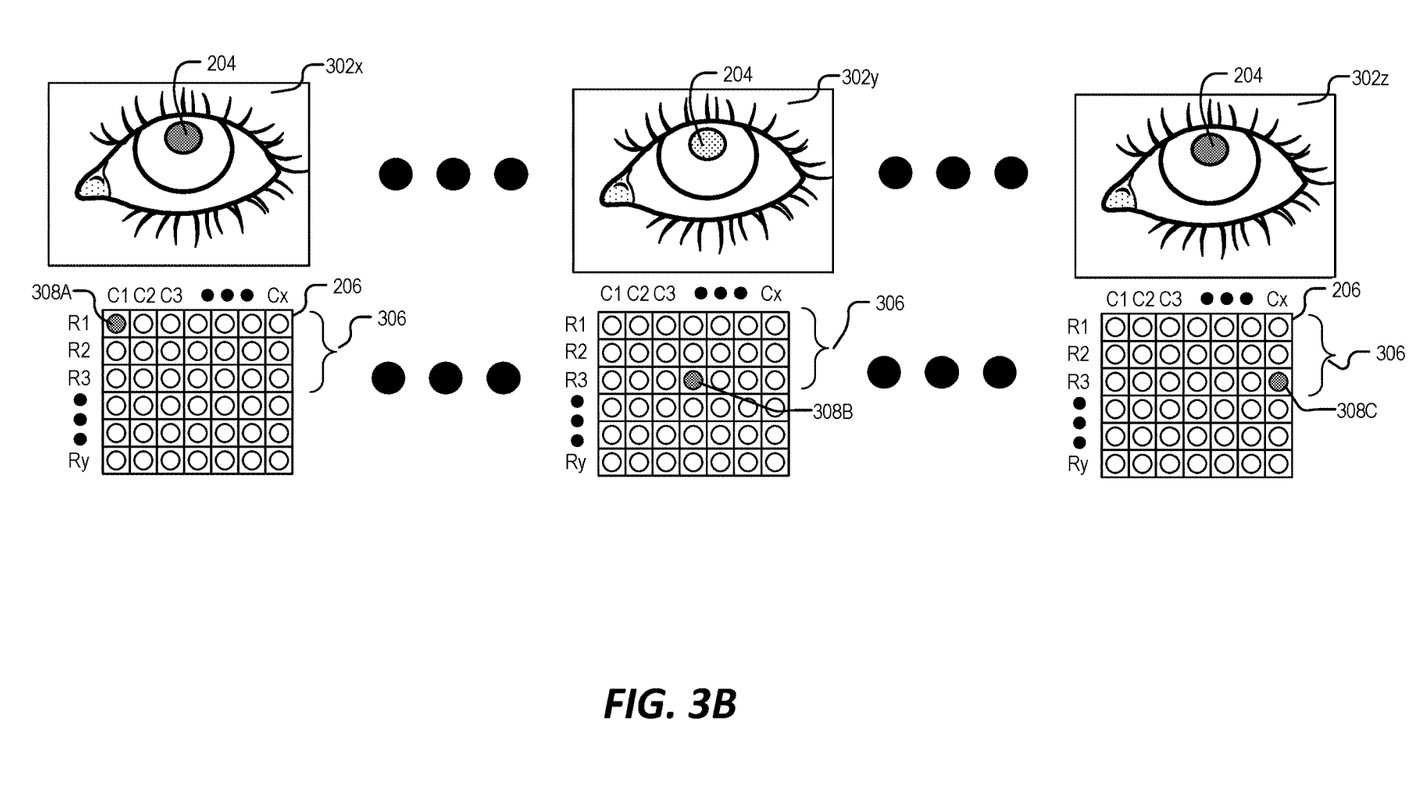
FIG. 3B illustrates an array of light sources and the corresponding images of an eye captured with individual light sources of a grouping are enabled, in accordance with aspects of the present disclosure.

For example, FIG. 3B illustrates the array of light sources 206 and the corresponding images 302x-302z of an eye captured when individual light sources of grouping 306 are enabled, in accordance with aspects of the present disclosure Image 302x is an image of the eye that was captured when light source 308A was enabled, image 302y is an image of the eye when light source 308B was enabled, and image 302z is an image of the eye when light source 308C was enabled. Although FIG. 3B only illustrates three images 302x-302z, as mentioned above, aspects of the present disclosure may include individually enabling each of the light sources included in the grouping 306. As shown in FIG. 3B, image 302y indicates a bright pupil condition, where the computing device may then determine a position of the eye based on the position of light source 308B within the array of light sources 206.

Figure 4:
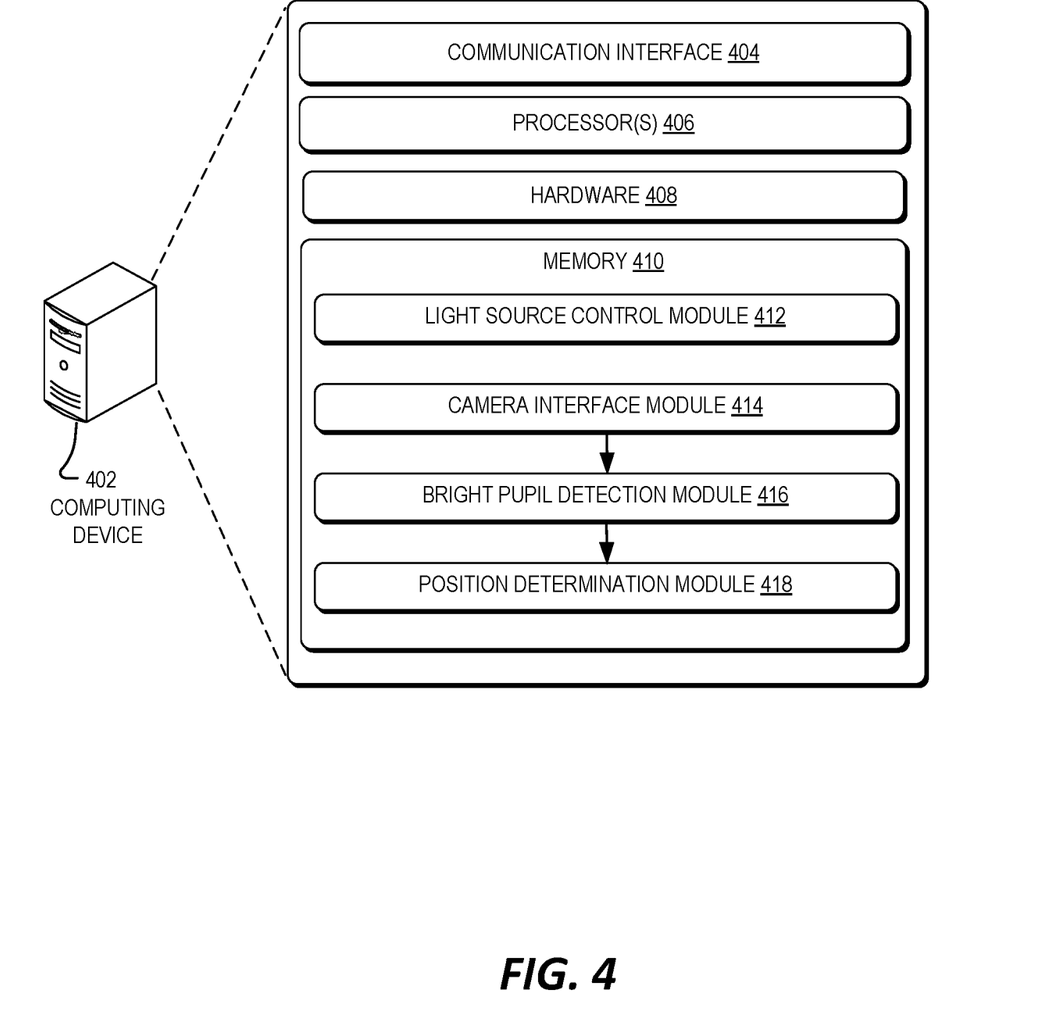
FIG. 4 illustrates a computing device, in accordance with aspects of the present disclosure.

FIG. 4 illustrates a computing device 402, in accordance with aspects of the present disclosure. The illustrated example of computing device 402 is shown as including a communication interface 404, one or more processors 406, hardware 408, and a memory 410. The computing device 402 of FIG. 4 is one possible implementation of the computing device 122 of FIG. 1A.

The communication interface 404 may include wireless and/or wired communication components that enable the computing device 402 to transmit data to and receive data from other devices/components. The hardware 408 may include additional hardware interface, data communication, or data storage hardware. For example, the hardware interfaces may include a data output device, and one or more data input devices.

The memory 410 may be implemented using computer-readable media, such as computer storage media. In some aspects, computer-readable media may include volatile and/or non-volatile, removable and/or non-removable media implemented in any method or technology for storage of information such as computer-readable instructions, data structures, program modules, or other data. Computer-readable media includes, but is not limited to, RAM, ROM, EEPROM, flash memory or other memory technology, CD-ROM, digital versatile disks (DVD), high-definition multi-media/data storage disks, or other optical storage, magnetic cassettes, magnetic tape, magnetic disk storage or other magnetic storage devices, or any other non-transmission medium that can be used to store information for access by a computing device.

The processors 406 and the memory 410 of the computing device 402 may implement a light source control module 412, a camera interface module 414, a bright pupil detection module 416, and a position determination module 418. The light source control module 412, camera interface module 414, bright pupil detection module 416, and the position determination module 418 may include routines, program instructions, objects, and/or data structures that perform particular tasks or implement particular abstract data types. The memory 410 may also include a data store (not shown) that is used by the light source control module 412, camera interface module 414, bright pupil detection module 416, and/or the position determination module 418.

The light source control module 412 may be configured to generate one or more control signals (e.g., control signals 124 of FIG. 1A) to enable and/or disable one or more of the light sources included in the array of light sources 102A-102G. The camera interface module 414 may be configured to receive images (e.g., images 123 of FIG. 1A). The camera interface module 414 may optionally be configured to trigger the camera 120 to capture one or more images in response to the light source control module 412 enabling a light source of the array of light sources. The bright pupil detection module 416 is configured to analyze one or more images to determine whether an image indicates the bright pupil condition. As mentioned above, the bright pupil detection module 416 may implement one or more computer-vision techniques to identify a pupil region and to determine a corresponding brightness of the pupil region. The bright pupil detection module 416 may detect the bright pupil condition by comparing the brightness of the pupil region among two or more images or, alternatively, may detect the bright pupil condition by comparing the brightness of the pupil region on an image with the brightness threshold. In response to the bright pupil detection module 416 detecting the bright pupil condition, the position determination module 418 may determine a position of the eye based on a position of the light source that was enabled for the image that indicates such a bright pupil condition. As mentioned above, the position of the eye may be determined by translating the position of the light source to a calculated eye-position and/or gaze angle.

Figure 5:
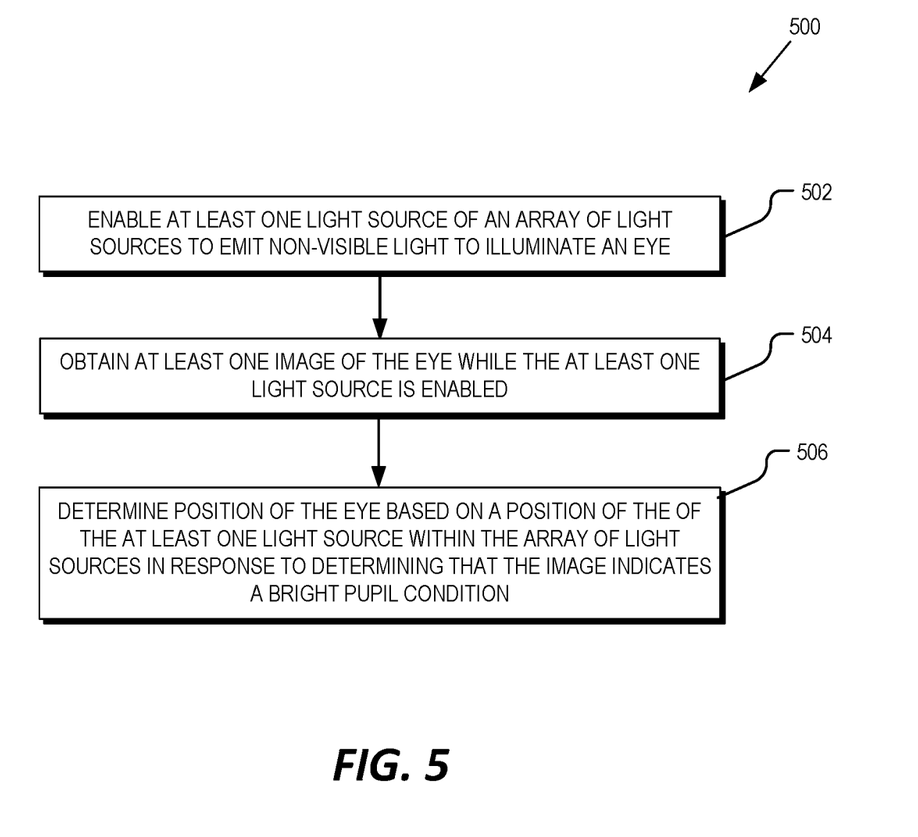
FIG. 5 is a flow chart illustrating a process of eye-tracking, in accordance with aspects of the present disclosure.

FIG. 5 is a flow chart illustrating a process 500 of eye-tracking, in accordance with aspects of the present disclosure. Process 500 is one possible process of eye-tracking performed by the eye-tracking system 100A of FIG. 1A. In a process block 502, the computing device 122 of FIG. 1A may generate a control signal 124 to enable at least one light source 102G of the array of light sources 102A-102G to emit non-visible light 107 to illuminate an eye 114. In a process block 504, the computing device 122 may obtain (e.g., receive) at least one image 123 of the eye 114 that was captured by the camera 120 while the at least one light source 102G was enabled. Next, in a process block 508, the computing device 122 may determine a position of the eye 114 based on a position of the at least one light source 102G within the array of light sources 102A-102G in response to determining that the image 123 indicates a bright pupil condition.

Figure 6:
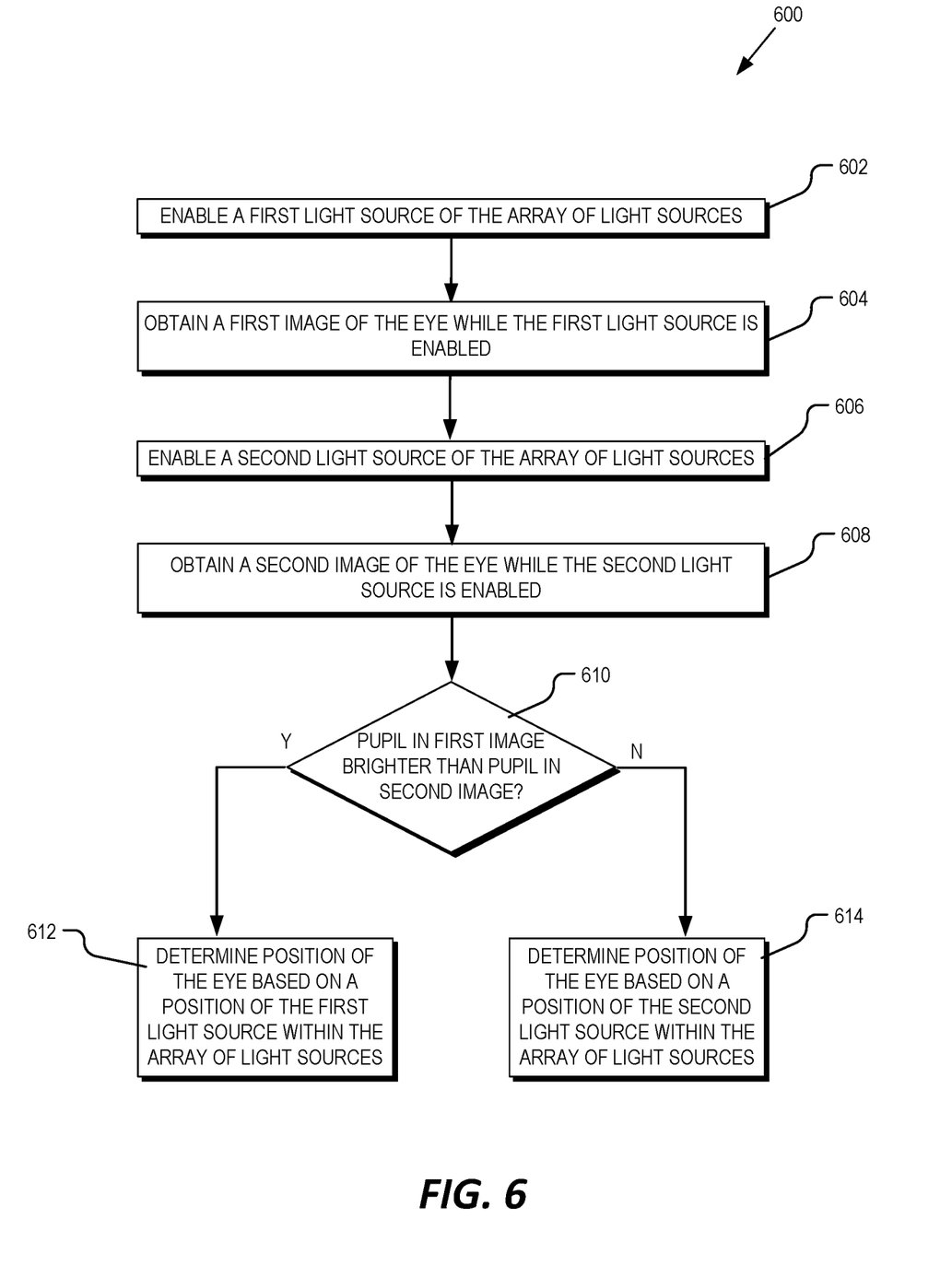
FIG. 6 is a flow chart illustrating another process of eye-tracking that includes enabling a first and a second light source, in accordance with aspects of the present disclosure.

FIG. 6 is a flow chart illustrating another process 600 of eye-tracking that includes enabling a first and a second light source, in accordance with aspects of the present disclosure. Process 600 is described with reference to FIG. 2. In a process block 602 a first light source 208A of the array of light sources 206 is enabled to emit non-visible light to illuminate an eye. In a process block 604, a first image 202A is obtained that is an image of the eye captured when the first light source 208A was enabled. Next, in a process block 606 a second light source 208E is enabled to emit non-visible light to illuminate the eye (e.g., and the first light source 208A is disabled). Process block 608 includes obtaining the image 202E that was captured by the camera (e.g., camera 120) while the second light source 208E was enabled.

In a decision block 610, the computing device (e.g., computing device 122) determines whether the pupil 204 in the first image 202A is brighter than the pupil 204 in the second image 202E. If the pupil 204 in the first image 202A is determined to be brighter than the pupil 204 in the second image 202E, then process 600 proceeds to process block 612, where the computing device determines the position of the eye based on the position of the first light source 208A within the array of light sources 206. If, however, in decision block 610, it is determined that the pupil 204 in the first image 202A is not brighter than the pupil 204 in the second image 202E (i.e., the pupil 204 in the second image 202E is brighter), then process 600 proceeds to process block 614 where the position of the eye is determined based on the position of the second light source 208E with the array of light sources 206.

Although process 600 is described above with reference to the enabling of only two of the light sources (and obtaining a corresponding two images), as described above, aspects of the present disclosure may include individually enabling two or more of the light sources included in the array of light sources 102A-102G, where the brightness's of each of the obtained images are compared to one another to determine which image indicates the bright pupil condition.

Figure 7:
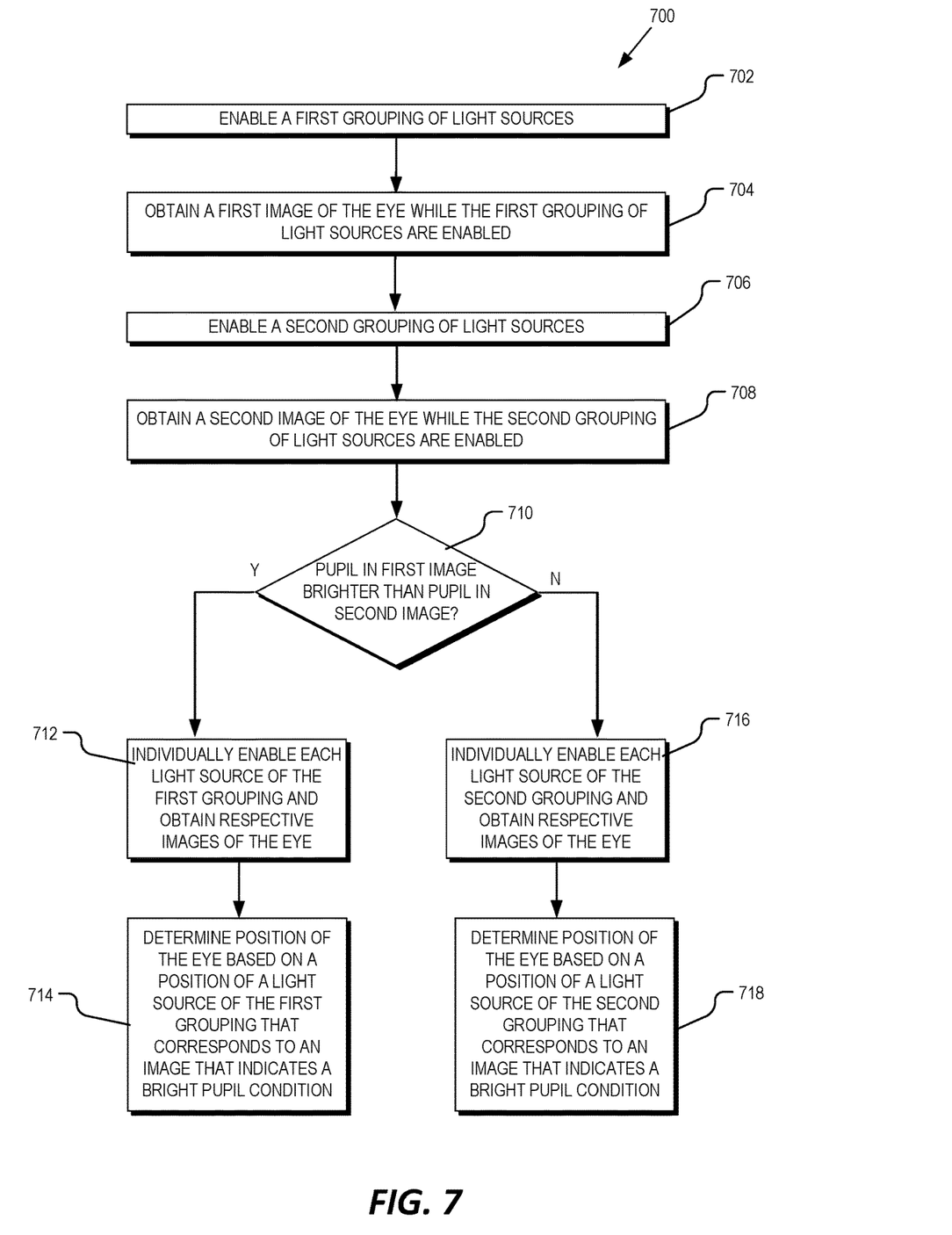
FIG. 7 is a flow chart illustrating a process of eye-tracking that includes enabling a first and a second grouping of light sources, in accordance with aspects of the present disclosure.

FIG. 7 is a flow chart illustrating a process 700 of eye-tracking that includes enabling a first and a second grouping of light sources, in accordance with aspects of the present disclosure. Process 700 is described with reference to FIGS. 3A and 3B.

In a process block 702 a first grouping 304 of light sources is enabled to emit non-visible light to illuminate an eye. In a process block 704, a first image 302A is obtained that is an image of the eye while all light sources included in the first grouping 304 were simultaneously enabled. In a process block 706, a second grouping 306 of light sources is enabled to emit the non-visible light. Process block 708 includes obtaining the second image 302B that is an image of the eye while all light sources included in the second grouping 306 were simultaneously enabled (e.g., and light sources of the first grouping 304 were disabled).

Next, in decision block 710, the computing device (e.g., computing device 122) determines whether the pupil 204 in the first image 302A is brighter than the pupil 204 in the second image 302B. If the pupil 204 in the first image 302A is determined to be brighter than the pupil 204 in the second image 302B, then process 700 proceeds to process block 712, where each light source within the first grouping 304 are individually enabled and respective images of the eye are obtained (e.g., captured by camera 120). In a process block 714, the computing device then determines a position of the eye based on a position of a light source of the first grouping 304 that corresponds to an image (i.e., obtained in process block 712) that indicates a bright pupil condition.

Returning to decision block 710, if the pupil 204 in the first image 302A is not brighter than the pupil 204 in the second image 302B, then process 700 proceeds to process block 716 where each of the light sources included in the second grouping 306 are individually enabled and respective images of the eye are obtained. In a process block 718, the computing device may then determine the position of the eye based on a position of a light source of the second grouping 306 that corresponds to an image (i.e., obtained in process block 716) that indicates the bright pupil condition.

In some implementations, aspects of the present disclosure may be utilized in a head mounted device, such as a virtual reality (VR) or augmented reality (AR) device. In some aspects, a head mounted device may incorporate an eye-tracking system to enhance a user's viewing experience. Eye-tracking, may in some instances, be aided by determining the position and/or movement of the eye. For example, when the gaze angle is determined, a virtual image presented to a user by a display of a head mounted device may be adjusted in response to the determined gaze angle.

Figure 8:
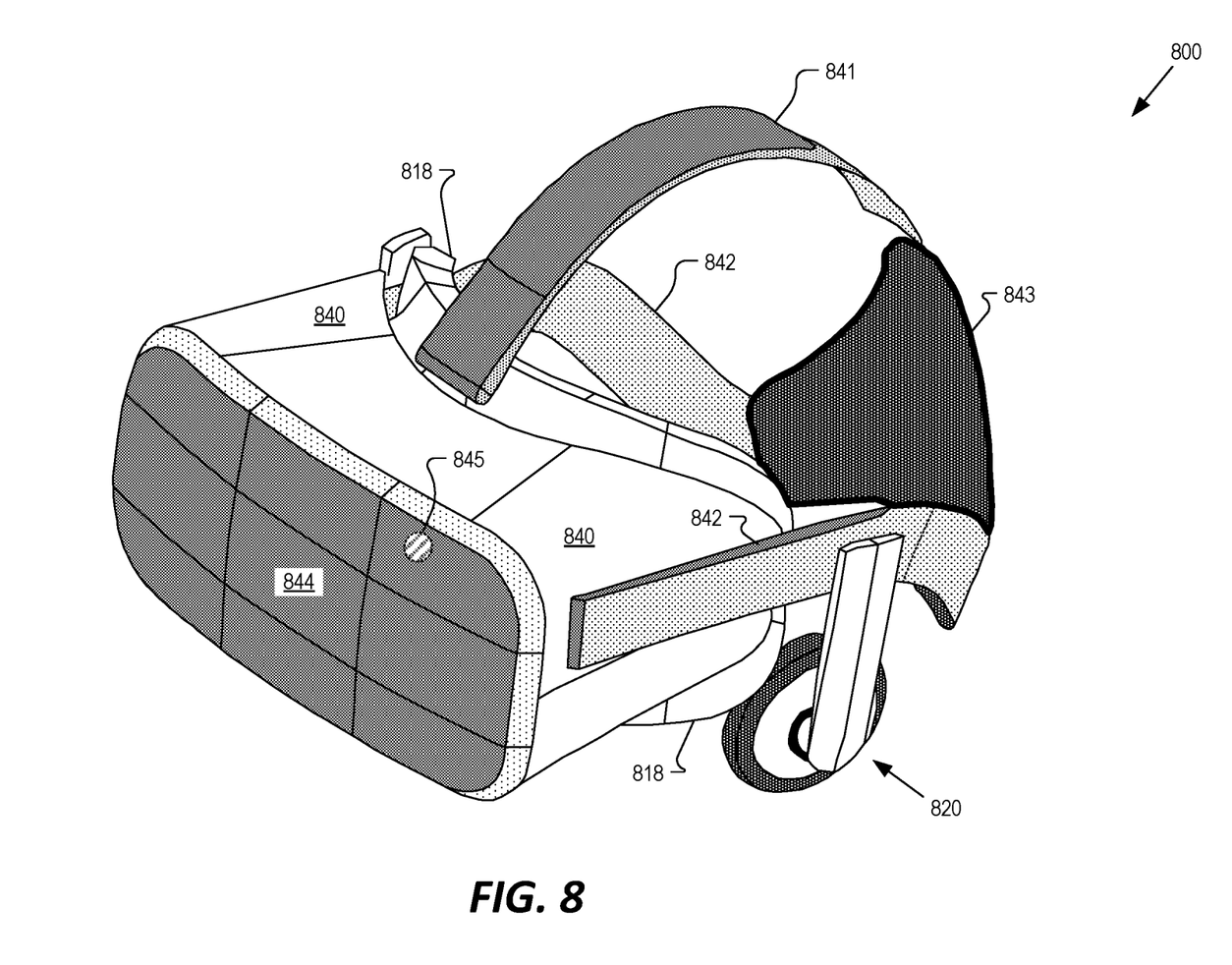
FIG. 8 illustrates a head mounted display (HMD), in accordance with aspects of the present disclosure.

By way of example, FIG. 8 illustrates a head-mounted display (HMD) 800, in accordance with aspects of the present disclosure. An HMD, such as HMD 800, is one type of head mounted device, typically worn on the head of a user to provide artificial reality content to a user. Artificial reality is a form of reality that has been adjusted in some manner before presentation to the user, which may include, e.g., virtual reality (VR), augmented reality (AR), mixed reality (MR), hybrid reality, or some combination and/or derivative thereof. The illustrated example of HMD 800 is shown as including a viewing structure 840, a top securing structure 841, a side securing structure 842, a rear securing structure 843, and a front rigid body 844. In some examples, the HMD 800 is configured to be worn on a head of a user of the HMD 800, where the top securing structure 841, side securing structure 842, and/or rear securing structure 843 may include a fabric strap including elastic as well as one or more rigid structures (e.g., plastic) for securing the HMD 800 to the head of the user. HMD 800 may also optionally include one or more earpieces 820 for delivering audio to the ear(s) of the user of the HMD 800.

The illustrated example of HMD 800 also includes an interface membrane 818 for contacting a face of the user of the HMD 800, where the interface membrane 818 functions to block out at least some ambient light from reaching to the eyes of the user of the HMD 800.

Example HMD 800 may also include a chassis for supporting hardware of the viewing structure 840 of HMD 800 (chassis and hardware not explicitly illustrated in FIG. 8). The hardware of viewing structure 840 may include any of processing logic, wired and/or wireless data interface for sending and receiving data, graphic processors, and one or more memories for storing data and computer-executable instructions. In one example, viewing structure 840 may be configured to receive wired power and/or may be configured to be powered by one or more batteries. In addition, viewing structure 840 may be configured to receive wired and/or wireless data including video data.

Viewing structure 840 may include a display system having one or more electronic displays for directing light to the eye(s) of a user of HMD 800. The display system may include one or more of a liquid crystal display (LCD), an organic light emitting diode (OLED) display, a micro-LED display, etc. for emitting light (e.g., content, images, video, etc.) to a user of HMD 800. The viewing structure 840 may also include an optical assembly that is configured to receive the image light from the display system and generate a virtual image (e.g., by collimating the image light) for viewing by an eye of a wearer of the HMD 800.

In some examples, viewing structure includes an eye-tracking system 845 for tracking movements and/or determining a position of the user's eye. The eye-tracking system 845 may be implemented by way of any of the embodiments discussed herein, including eye-tracking system 100A of FIG. 1A.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An eye-tracking method, comprising:
enabling at least one light source of an array of light sources to emit non-visible light that propagates through an optical combiner to an eyeward side of an eye-tracking system to illuminate an eye, wherein the optical combiner is configured as a holographic optical element or a volume hologram to direct reflected non-visible light that is reflected by the eye to a camera disposed on the eyeward side of the eye-tracking system, and wherein the optical combiner is positioned on an optical axis between each light source of the array of light sources and the eye;
obtaining at least one image of the eye with the camera while the at least one light source is enabled; and
determining a position of the eye based on a position of the at least one light source within the array of light sources in response to determining that the at least one image indicates a bright pupil condition when the at least one light source was enabled.

2. The eye-tracking method of claim 1, where determining that the at least one image indicates the bright pupil condition comprises:

comparing a brightness of the pupil in the at least one image with a brightness of the pupil in another image that corresponds to when another light source of the array of light sources is enabled to emit non-visible light to illuminate the eye.

3. The eye-tracking method of claim 1, wherein determining that the at least one image indicates the bright pupil condition comprises:
  comparing a brightness of the pupil in the at least one image with a brightness threshold.

4. The eye-tracking method of claim 1, further comprising:
  enabling a first light source of the array of light sources to emit non-visible light to illuminate the eye;
  obtaining a first image of the eye while the first light source is enabled;
  enabling a second light source of the array of light sources to emit non-visible light to illuminate the eye;
  obtaining a second image of the eye while the second light source is enabled; and
  determining the position of the eye based on a position of the first light source within the array of light sources in response to determining that the pupil of the eye in the first image is brighter than the pupil of the eye in the second image.

5. The eye-tracking method of claim 4, further comprising:
  determining the position of the eye based on a position of the second light source within the array of light sources in response to determining that the pupil of the eye in the second image is brighter than the pupil of the eye in the first image.

6. The eye-tracking method of claim 1, wherein the non-visible light comprises infrared or near-infrared light.

7. The eye-tracking method of claim 1, further comprising:
  enabling a first grouping of light sources of the array of light sources;
  obtaining a first image of the eye while the first grouping of light sources are enabled;
  enabling a second grouping of light sources of the array of light sources;
  obtaining a second image of the eye while the second grouping of light sources are enabled;
  comparing a brightness of the pupil in the first image with a brightness of the pupil in the second image; and
  determining that the pupil is aligned with the first grouping of light sources in response to determining that the pupil in the first image is brighter than the pupil in the second image.

8. The eye-tracking method of claim 7, further comprising:
  individually enabling each light source of the first grouping in response to determining that the pupil is aligned with the first grouping of light sources;
  obtaining respective images of the eye while each light source of the first grouping of light sources are individually enabled; and
  determining that one image of the respective images indicates the bright pupil condition, wherein determining the position of the eye is based on a position of one of the light sources included in the first grouping that corresponds to the one image that indicates the bright pupil condition.

9. The eye-tracking method of claim 7, further comprising:
  determining that the pupil is aligned with the second grouping of light sources in response to determining that the pupil in the second image is brighter than the pupil in the first image;
  individually enabling each light source of the second grouping in response to determining that the pupil is aligned with the second grouping of light sources;
  obtaining respective images of the eye while each light source of the second grouping of light sources is individually enabled; and
  determining that one image of the respective images indicates the bright pupil condition, wherein determining the position of the eye is based on a position of one of the light sources included in the second grouping that corresponds to the one image that indicates the bright pupil condition.

10. An eye-tracking system, comprising:
  an array of light sources, wherein each light source of the array of light sources is configured to be selectively enabled to emit non-visible light to an eyeward side of the eye-tracking system to illuminate an eye;
  a camera disposed on the eyeward side of the eye-tracking system, wherein the camera is configured to capture images of the eye based on the non-visible light;
  an optical combiner disposed on an optical axis between each light source of the array of light sources and the eye on the eyeward side of the eye-tracking system, wherein the optical combiner is configured as a holographic optical element or a volume hologram to receive reflected non-visible light that is reflected by the eye and to direct the reflected non-visible light to the camera to generate the images of the eye; and
  a computing device communicatively coupled to the array of light sources and the camera, wherein the computing device comprises:
    a light source control module configured to enable at least one light source of the array of light sources;
    a camera interface module configured to obtain at least one image of the eye, captured by the camera while the at least one light source was enabled;
    a bright pupil detection module configured to detect whether the at least one image indicates a bright pupil condition; and
    a position determination module configured to determine a position of the eye based on a position of the at least one light source within the array of light sources in response to the bright pupil detection module determining that the at least one image indicates the bright pupil condition.

11. The eye-tracking system of claim 10, where the bright pupil detection module is configured to:
  compare a brightness of the pupil in the at least one image with a brightness of the pupil in another image that corresponds to when another light source of the array of light sources is enabled to emit non-visible light to illuminate the eye.

12. The eye-tracking system of claim 10, wherein the bright pupil detection module is configured to:
  compare a brightness of the pupil in the at least one image with a brightness threshold.

13. The eye-tracking system of claim 10, wherein the non-visible light comprises infrared or near-infrared light.

14. The eye-tracking system of claim 10, wherein the optical combiner is configured to diffract the reflected non-visible light to the camera to generate the images of the eye.

15. The eye-tracking system of claim 14, wherein the array of light sources comprises a transparent substrate and wherein each light source of the array of light sources is disposed on the transparent substrate.

16. The eye-tracking system of claim 10, further comprising a plurality of beam shaping optics, wherein each beam shaping optic of the plurality of beam shaping optics is disposed on a corresponding light source of the array of light sources to direct the non-visible light emitted by each respective light source along a corresponding optical axis.

17. The eye-tracking system of claim 16, wherein each beam shaping optic of the plurality of beam shaping optics are configured to collimate the non-visible light into collimated non-visible light.

18. The eye-tracking system of claim 17, further comprising:
an optical element disposed between the plurality of beam shaping optics and the eyeward side of the eye-tracking system to focus the collimated non-visible light onto a pupil plane of the eye.

19. A head-mounted display (HMD), comprising:
an array of light sources, wherein each light source of the array of light sources is configured to be selectively enabled to emit non-visible light to an eyeward side of the HMD to illuminate an eye;
a camera disposed on the eyeward side of the HMD, wherein the camera is configured to capture images of the eye;
an optical combiner disposed between the array of light sources and the eyeward side, wherein the optical combiner is configured to receive reflected non-visible light that is reflected by the eye and to direct the reflected non-visible light to the camera to generate the images of the eye;
a display layer disposed between the optical combiner and a backside of the HMD, the display layer configured to provide display light that propagates through the optical combiner to the eyeward side of the HMD; and
a computing device communicatively coupled to the array of light sources and the camera, wherein the computing device comprises:
a light source control module configured to enable at least one light source of the array of light sources;
a camera interface module configured to obtain at least one image of the eye, captured by the camera while the at least one light source was enabled;
a bright pupil detection module configured to detect whether the at least one image indicates a bright pupil condition; and
a position determination module configured to determine a position of the eye based on a position of the at least one light source within the array of light sources in response to the bright pupil detection module determining that the at least one image indicates the bright pupil condition.

20. The HMD of claim 19, wherein each light source of the array of light sources is disposed on the display layer.

* * * * *